(12) United States Patent
Hortop et al.

(10) Patent No.: US 6,749,452 B2
(45) Date of Patent: Jun. 15, 2004

(54) FUEL CELL MONITOR CONNECTOR

(75) Inventors: Matthew K. Hortop, Rochester, NY (US); William S. Wheat, Rochester, NY (US); Patricia J. Nelson, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/098,783

(22) Filed: Mar. 14, 2002

(65) Prior Publication Data

US 2003/0186573 A1 Oct. 2, 2003

(51) Int. Cl.[7] .............................................. H01R 13/15
(52) U.S. Cl. ...................................................... 439/260
(58) Field of Search ................................ 439/259–268, 439/654, 269.1, 269.2, 270; 429/22, 23, 12, 13

(56) References Cited

U.S. PATENT DOCUMENTS

| | | | | |
|---|---|---|---|---|
| 4,402,563 A | * | 9/1983 | Sinclair | 439/264 |
| 4,469,385 A | * | 9/1984 | Petit et al. | 439/96 |
| 4,867,697 A | * | 9/1989 | Borges | 439/265 |
| 6,129,895 A | * | 10/2000 | Edmondson | 422/78 |

OTHER PUBLICATIONS

Notification Of Transmittal Of The International Search Report Or The Declaration, dated Jul. 28, 2003.

* cited by examiner

*Primary Examiner*—Ross Gushi
(74) *Attorney, Agent, or Firm*—Cary W. Brooks; Linda M. Deschere

(57) ABSTRACT

A fuel cell monitor connector electrically connects a fuel cell monitor to a fuel cell stack. The fuel cell monitor connector includes a non-conductive housing. First connectors on the housing align with second connectors located on fuel cell plates of the fuel cell stack. A third connector on the housing mates with a fourth connector coupled to the monitor. Conductors connect the first connectors to the third connector. A clamping device includes a lever and has locked and released positions. When the clamping device is in the locked position, the first connectors retain the second connectors. When the clamping device is in the released position, the first connectors release the second connectors. The clamping device is a zero insertion force connector.

24 Claims, 4 Drawing Sheets

FUEL CELL MONITOR CONNECTOR

FIELD OF THE INVENTION

The present invention relates to fuel cells, and more particularly to a fuel cell monitor connector for fuel cells that employ a fuel cell monitor for measuring electrical characteristics of fuel cells in a fuel cell stack.

BACKGROUND OF THE INVENTION

Fuel cell systems have been proposed as a power plant for vehicles such as automobiles and as a portable or fixed power generator. The fuel cell stack includes a plurality of fuel cells each having a positive electrode or cathode and a negative electrode or anode. When hydrogen is supplied to the anode and oxygen is supplied to the cathode of the fuel cell, a chemical reaction occurs that generates electricity.

A single fuel cell generates a small DC voltage. Usually multiple fuel cells are connected together to supply a larger DC voltage. During the design of the fuel cell stack, the electrical characteristics such as the voltage and current of each fuel cell are measured to evaluate the overall efficiency of the fuel cell system.

Conventionally, a technician solders individual wires to each fuel cell. The wires are also attached to a fuel cell monitor. During operation, the fuel cell can experience vibrations, which may sever one or more connections. This connection approach is also susceptible to contamination and incidental contact that will adversely impact the measurement of the electrical characteristic.

In another conventional connection approach, the wires are soldered in tiny holes that are formed in the fuel cell plates. In still another conventional wiring approach, the wires are connected to a "rake" of spaced, rigid metal fingers. The spacing of the metal fingers aligns with connection locations on the fuel cell plates. In yet another connection approach, the wires are connected to a spade connector that is attached to a metal tab that is formed in the fuel cell plates.

While the spade connector approach is an improvement, it still requires the individual connection of many delicate wires in a confined space. This approach is undesirable for designing fuel cell stacks due to the frequent connection and disconnection encountered during testing. This approach is also undesirable for mass production due to the relatively high assembly time, the high probability of connection errors, and the low reliability of the individual wire connections.

SUMMARY OF THE INVENTION

A fuel cell monitor connector electrically connects a fuel cell monitor to a fuel cell stack. The fuel cell monitor connector includes a non-conductive housing. First connectors on the housing align with second connectors located on fuel cell plates of the fuel cell stack. A third connector on the housing mates with a fourth connector coupled to the monitor. Conductors connect the first connectors to the third connector.

In other features of the invention, a clamping device has locked and released positions. When the clamping device is in the locked position, the first connectors retain the second connectors. When the clamping device is in the released position, the first connectors release the second connectors. The clamping device includes a lever.

In still other features, a fastener that attaches the housing to the fuel cell stack. The fastener includes a threaded bolt and the housing includes a bore for receiving the threaded bolt.

In yet other features, the first connectors are sockets located in the housing and the second connectors include pins on the fuel cell plates that are received by the sockets. A plurality of insertion holes formed in the housing that are aligned with the second connectors of the fuel cell plates.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
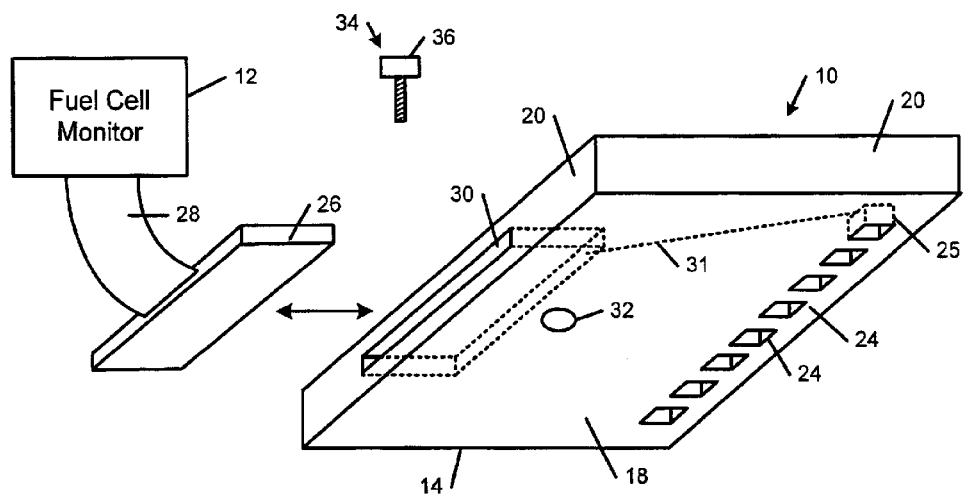
FIG. 1 is a bottom perspective view of a fuel cell monitor connector according to the present invention and a fuel cell monitor.

Referring now to FIG. 1, a fuel cell monitor connector 10 quickly attaches a fuel cell monitor 12 to a plurality of fuel cell plates of a fuel cell stack. The fuel cell monitor connector 10 includes a housing 14 that is preferably made of a nonconductive material such as plastic. The housing 14 includes a bottom surface 18 and sides 20. A plurality of insertion holes 24 are formed in the bottom surface 18 of the housing 14.

In the exemplary embodiment, the insertion holes 24 are separated by a uniform distance and are arranged in a single row. The housing 14 and the insertion holes 24 are rectangular in shape. Skilled artisans can appreciate that the insertion holes 24 may also be staggered and/or arranged in multiple rows. The housing 14 and the insertion holes 24 may also have other shapes.

First connectors 25 are located in the insertion holes 24 of the housing 14. In the illustrated embodiment, the first connectors 25 are connection sockets that are located in the insertion holes 24. A second connector 26 is connected by insulated conductors 28 to the fuel cell monitor 12. The housing 14 includes an integrally formed third connector 30 that mates with the second connector 26. The third connector 30 may be located on the sides 20 or in any other suitable location of the housing 14. Conductors 31 in the housing 14 connect the first connector 25 to the third connector 30. The third connector 30 is releasably connectable to the second connector 26.

The housing 14 can be attached to the fuel cell stack in any suitable manner. For example, the housing 14 includes a bore 32 for receiving a fastener 34. The fastener 34 can be a threaded bolt 36 that is received by a threaded bore formed in the fuel cell stack or an adjacent structure. The bore 32 extends through the housing 14. The bore 32 and the fastener 34 allow the housing 14 to be securely mounted onto a fuel cell stack. More than one bore 32 and fastener 34 may be provided. Other types of conventional fasteners 34 are contemplated and may be used to connect the fuel cell monitor connector 10 onto the fuel cell stack.

The fuel cell monitor 12 measures an electrical characteristic of the fuel cells such as voltage, current, resistance, capacitance, and/or inductance. Preferably, the fuel cell monitor 12 monitors voltage. The fuel cell monitor 12 is preferably located external from the fuel cell stack. However, the fuel cell monitor 12 and the fuel cell monitor connector 10 may also be connected together or integrated into a single package. Integration would reduce the mass, cost and complexity of the fuel cell monitoring system and improve reliability.

Figure 2:
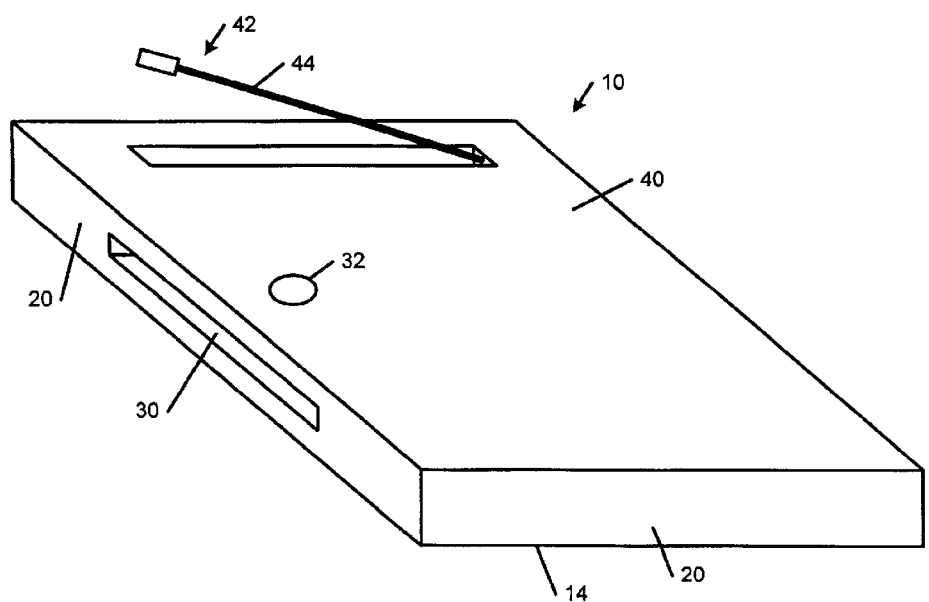
FIG. 2 is a top perspective view of the fuel cell monitor connector.

Referring now to FIG. 2, a top surface 40 of the fuel cell monitor connector 10 is shown. The fuel cell monitor connector 10 includes a clamping device 42 with a lever 44 that can be moved between locked and released positions. In a preferred embodiment, the first connectors 25 require zero insertion force (ZIF) when connecting the fuel cell monitor connector 10 to the fuel cell plates. ZIF connectors help to reduce damage that may occur when attaching and removing the fuel cell monitor connector 10 to/from the fuel cell stack. ZIF connectors and sockets reduce the required insertion force while providing a robust electrical connection.

Figure 3:
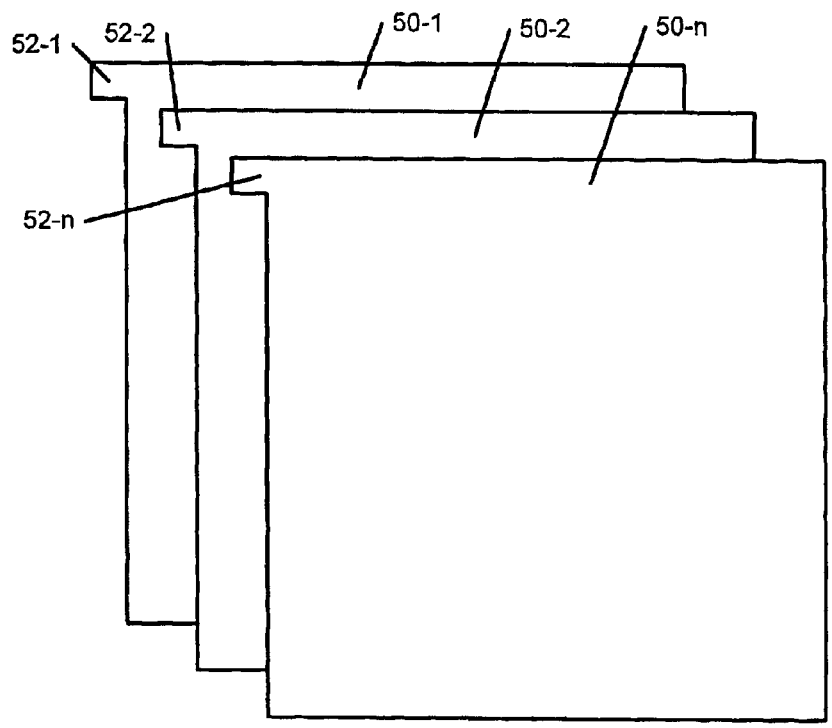
FIG. 3 illustrates exemplary fuel cell plates.

Referring now to FIG. 3, a plurality of aligned fuel cell plates 50-1, 50-2, . . . , and 50-n of a fuel cell stack 51 are shown. The plates 50-1, 50-2, . . . , and 50-n include fourth connectors 52-1, 52-2, . . . , and 52-n. The fourth connectors 52 are preferably projections that extend from the plates 50. Although the fourth connectors 52 are formed in a corner of the plates 50 in FIG. 3, the fourth connectors 52 may also be formed in other locations on the plates 50. The fourth connectors 52 may also have various different shapes.

Figure 4:
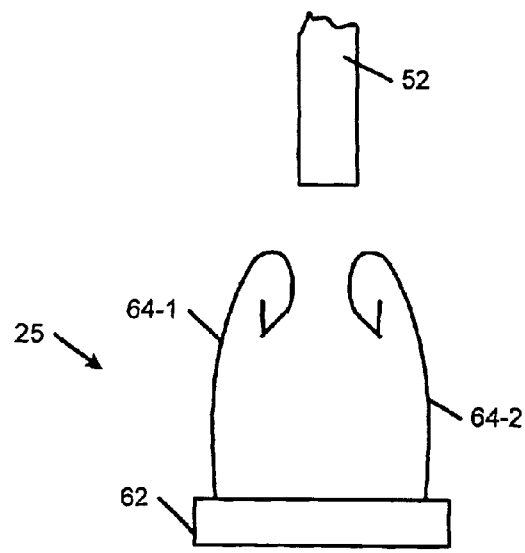
FIG. 4 illustrates an exemplary socket.

Referring now to FIG. 4, an exemplary first connector 25 that is located in the insertion holes 24 is shown. The first connector 25 is preferably a socket with a base 62. The base 62 is electrically connected to a conductor that, in turn, is connected to the third connector 30. A pair of generally "g"-shaped conductors 64-1 and 64-2 extend from the base 62. As can be appreciated, the conductors 64 may have other shapes. The conductor 64-1 faces the conductor 64-2. The conductors 64 provide an electrical connection to the fourth connectors 52 when the fourth connectors 52 are inserted through the insertion holes 24. The conductors 64 are preferably spring loaded or biased by the clamping device 42 to positively engage the fourth connector 52 and to provide a robust electrical connection.

In use, the insertion holes 24 are aligned with the fourth connectors 52 of the aligned fuel cell plates 50. The fourth connectors 52 are inserted between the conductors 64 of the first connector 25. A spring-like action of the conductors 64 provides an electrical connection to the fourth connectors 52. The conductors 64 physically engage the fourth connectors to prevent separation due to vibration. Alternately, the clamping device 42 is moved from the released position to the locked position.

Figure 5:
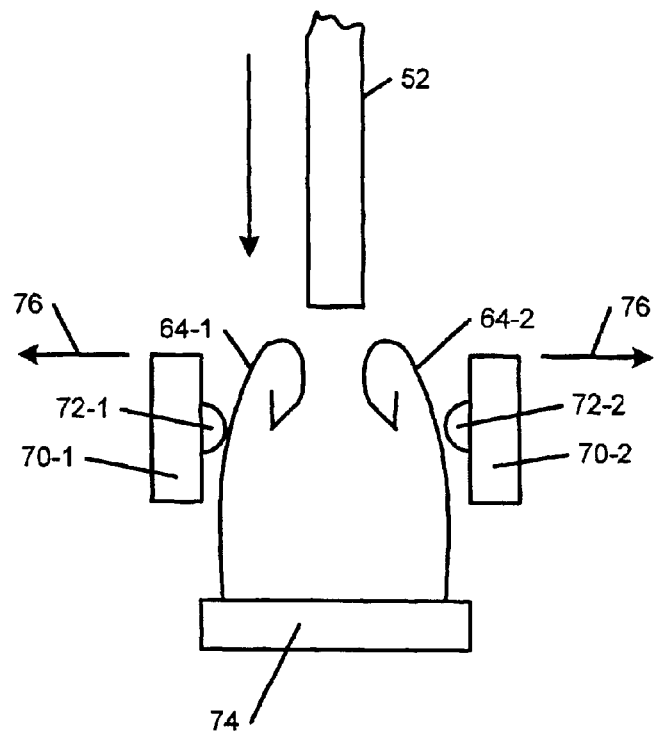
FIG. 5 is a partial side view of the components of a zero insertion force (ZIF) clamping assembly in a released position.
Figure 6:
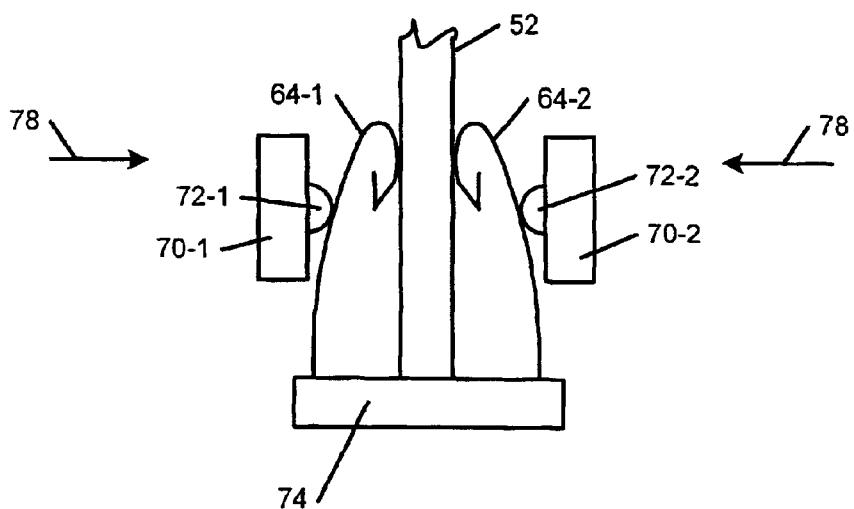
FIG. 6 is a partial side view of the components of the ZIF clamping assembly in a locked position.

Referring now to FIGS. 5 and 6, interactive operation of the components of the clamping device 42 and the first connector 25 are shown. The clamping device 42 includes a first arm 70-1 with projections 72-1 and a second arm 70-2 with projections 72-2. When the lever 44 (FIG. 2) is in one position, the arms 70 move outwardly (as indicated by arrows 76) into the released position when the fourth connector 52 is to be released or inserted. When the lever 44 (FIG. 2) is in the opposite position, the arms 70 move inwardly (as indicated by arrows 78) into the locked position when the fourth connector 52 is to be locked in place. As can be appreciated, the arms 70 and the projections 72 bias the conductors 64 inwardly against the fourth connector 52 to provide a robust electrical connection. Some deformation of the conductors 64 may occur.

Figure 7:
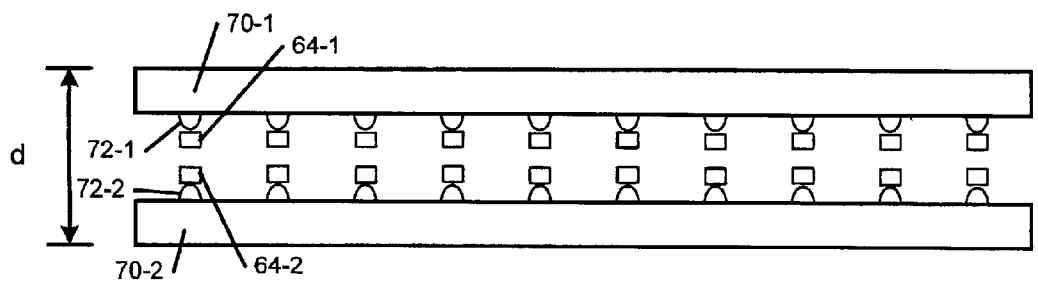
FIG. 7 is a partial plan view of the components of the ZIF clamping assembly in a released position.
Figure 8:
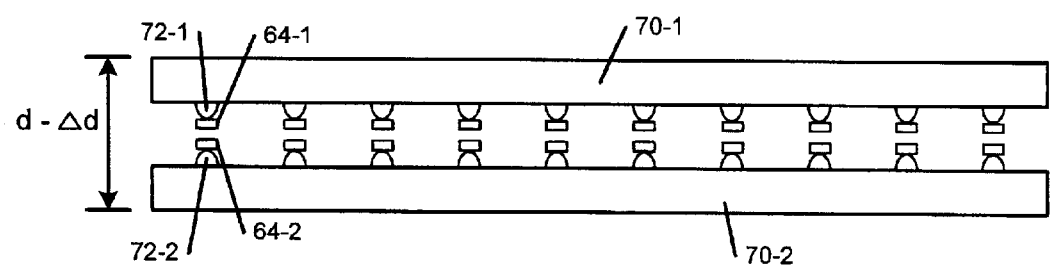
FIG. 8 is a partial plan view of the components of the ZIF clamping assembly in a locked position.

Referring now to FIGS. 7 and 8, an alternate view of the clamping device 42 of FIGS. 2, 5 and 6 are shown. The lever 44 (FIG. 2) moves the arms 70 outwardly (as indicated by arrows 76) into the released position when the fourth connector 52 is to be released or inserted. The arms 70 are initially spaced at a distance d. The lever 44 (FIG. 2) moves the arms 70 inwardly (as indicated by arrows 78) into the lock position when the fourth connector 52 is to be locked in place. The lever 44 moves the arms 70 closer together by a distance $\Delta d$.

The fuel cell voltage monitor connector of the present invention allows the fuel cell monitor to be quickly attached to the fuel cells of a fuel cell stack. The fuel cell monitor connector provides a reliable connection and eliminates the need for making individual connections. The present invention is easy to operate correctly and provides robust connections that withstand shock and vibration that occur during design validation and during use in a production fuel cell system.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel cell monitoring connector comprising:

a non-conductive housing having an insertion hole and a slot formed therein;

a set of female connectors located within said insertion hole;

a set of male connectors, of said set of male connectors extending from a plate within a fuel cell stack and received within said insertion hole such that one of said set of first male connectors is electrically coupled with a corresponding one of said set of first female connectors;

a set of cable connectors located within said slot;

a set of first conductors disposed within said housing, each of said set of first conductors electrically coupling one of said set of female connectors with a corresponding one of said set of cable connectors located within said slot; and an external cable having a set of second conductors terminating at a cable connector, said cable connector being received within said slot such that each of said set of cable connectors is in electrical connection with a corresponding one of said set of second conductors in said external cable to establish a path of electrical continuity from said set of male connectors through said external cable.

2. The fuel cell monitor connector of claim 1 wherein said fuel cell monitor connector further comprises a device with first and second positions, wherein when said device is in said first position, said first female connectors retain said first male connectors, and when said device is in said second position, said first female connectors release said first male connectors.

3. The fuel cell monitor connector of claim 1 wherein said set of female connectors are sockets that are located in a plurality of insertion holes formed in said housing and said set of male connectors include pin formed on said fuel cell plates that are received by said sockets.

4. The fuel cell monitor connector of claim 3 wherein said insertion holes are aligned with said set of male connectors of said fuel cell plates.

5. The fuel cell monitor connector of claim 1 further comprising a fastener that attaches said housing to said fuel cell stack.

6. The fuel cell monitor connector of claim 5 wherein said fastener reduces stress on said sets of female and male connectors.

7. The fuel cell monitor connector of claim 5 wherein said fastener includes a threaded bolt and said housing includes a bore for receiving said threaded bolt.

8. A method for electrically connecting a fuel cell monitor to a fuel cell stack, comprising:
   providing a connector having a set of female connectors located within a insertion hole formed in a non-conducting housing, a set of cable connectors located within a slot formed in said non-conductive housing, and a set of conductors disposed within said non-conductive housing, each of said set of conductors electrically coupling one of said set of female connectors with corresponding one of said set of cable connectors;
   aligning said set of female connectors located within said insertion hole with a set of male connectors extending from a plate within a fuel cell stack;
   positioning said non-conductive housing directly adjacent said fuel cell such that said set of male connectors are received within said insertion hole and electrically coupled with said set of first female connectors;
   releasably securing said non-conductive housing to said fuel cell;
   inserting a cable end of an external cable into said slot formed in said non-conductive housing such that each of said set of cable connectors are in electrical continuity with a conductor in said external cable to establish a path of electrical continuity from said set of male connectors through said external cable; and
   electrically connecting a second end of said external cable to a fuel cell monitor.

9. The method of claim 8 further comprising providing a fastener that attaches said housing to said fuel cell stack.

10. The method of claim 9 wherein said fastener includes a threaded bolt and said housing includes a bore for receiving said threaded bolt.

11. The method of claim 8 wherein said set of female connectors are sockets located in said housing and said set of male connectors are pins formed on said fuel cell plates.

12. The method of claim 8 further comprising:
   forming a plurality of insertion holes in said housing; and
   aligning said plurality of insertion holes with said set of male connectors of said fuel cell plates.

13. The method of claim 8 further comprising providing a clamping device with looked and released positions.

14. The method of claim 13 further comprising:
   fixedly connecting said set of male connectors to said set of female connectors when said clamping device is in said locked position; and
   releasing said set of male connectors from said set of female connectors when said clamping device is in said released position.

15. A fuel cell monitor connector for electrically connecting a fuel cell monitor to a fuel cell stack, comprising:
   a non-conductive housing having an insertion hole and a slot formed therein;
   a set of female connectors located within said insertion hole;
   a set of male connectors of said set of male connectors extending from a plate within a fuel cell stack and received within said insertion hole such that one of said set of first male connectors is electrically coupled with a corresponding one of said set of first female connectors;
   a set of cable connectors located within said slot;
   a set of first conductors disposed within said housing, each of said set of first conductors electrically coupling one of said set of female connectors with a corresponding one of said set of cable connectors located within said slot;
   an external cable having at of second conductors terminating at a cable connector, said cable connector being received within said slot such that each of said set of cable connectors is in electrical connection with a corresponding one of said set of second conductors in said external cable to establish a path of electrical continuity from said set of male connectors through said external cable; and
   a device that selectively biases said set of female connectors in locked and released positions.

16. The fuel cell monitor of claim 15, wherein when said device is in said locked position, said set of female connectors retain said set of male connectors, and wherein when said clamping device is in said released position, said set of female connectors release said set of male connectors.

17. The fuel cell monitor of claim 15 further comprising a fastener that attaches said housing to said fuel cell stack.

18. A fuel cell monitoring system comprising:
   a fuel cell stack having a plurality of fuel cell plates, each of said plurality of fuel cell plates having a male connector extending therefrom;
   a connector including:
      a non-conductive housing having an insertion hole and a slot formed therein;
      a set of female con ors located within said insertion hole, each of said set of male connectors being received in said insertion hole so as to be electrically coupled with a corresponding one of said set of first female connectors;
      a set of cable connectors located within said slot; and
      a set of first conductors disposed within said housing, each of said set of first conductors electrically coupling one of said set of female connectors with a corresponding one of said set of cable connectors located within said slot;
   an external cable having a first end, a second end and a set of second conductors electrically coupling said firs end and said second end, said first end being received within said slot such that each of said set of cable connectors is in electrical connection with a corresponding one of said set of second conductors in said external cable; and a fuel cell monitor receiving said second end of said external cable to establish a path of electrical continuity from said set of male connectors through said connector and said external cable to said fuel cell monitor.

19. The cell system of claim 18 wherein said fuel cell monitor connector further comprises a clamping device with locked and released positions, wherein when said clamping device is in said locked position, said first female connectors retain said first male connectors, and when said clamping device is in said released position, said first female connector release said first male connectors.

20. The fuel cell system of claim 18 wherein said first female connectors are sockets that are located in insertion holes formed in said housing and said first male connectors include pins formed on said fuel cell plates that are received by said sockets.

21. The fuel cell system of claim 20 wherein said insertion holes are aligned with said first male connectors of said fuel cell plates.

22. The fuel cell system of claim 18 further comprising a fastener that attaches said housing to said fuel cell stack.

23. The fuel cell system of claim 22 wherein said fastener reduces stress on said first female and first male connectors.

24. The fuel cell system of claim 22 wherein said fastener includes a threaded bolt and said housing includes a bare for receiving said threaded bolt.

* * * * *